United States Patent [19]

McNair

[11] Patent Number: 4,608,455

[45] Date of Patent: Aug. 26, 1986

[54] PROCESSING OF ENCRYPTED VOICE SIGNALS

[75] Inventor: Bruce E. McNair, Holmdel, N.J.

[73] Assignee: Bell Telephone Laboratories, Incorporated, Holmdel, N.J.

[21] Appl. No.: 365,630

[22] Filed: Apr. 5, 1982

[51] Int. Cl.[4] .............................................. H04L 9/02
[52] U.S. Cl. ................................ 178/22.17; 179/1.5 R
[58] Field of Search .... 178/22.17, 22.11, 22.13–22.16; 179/1.5 R; 455/26, 51, 223, 296; 375/2.1, 114, 116, 104; 371/39, 40, 42, 47

[56] References Cited

U.S. PATENT DOCUMENTS

| | | | |
|---|---|---|---|
| 3,613,012 | 10/1971 | Feistel | 325/474 |
| 3,659,046 | 4/1972 | Angeleri et al. | 455/26 |
| 3,894,201 | 7/1975 | Pyles | 179/100.4 ST |
| 3,962,646 | 6/1976 | Tempka | 325/478 |
| 4,020,421 | 4/1977 | Elder et al. | 375/5 |
| 4,114,105 | 9/1978 | Duncan | 455/223 |
| 4,312,070 | 1/1982 | Coombes et al. | 455/51 |
| 4,430,742 | 2/1984 | Milleker et al. | 375/104 |

OTHER PUBLICATIONS

Federal Information Processing Standards, Publication 81.

*Primary Examiner*—Salvatore Cangialosi
*Assistant Examiner*—Gregory C. Issing
*Attorney, Agent, or Firm*—Barry H. Freedman

[57] ABSTRACT

The occurrence of a transmission error which produces a multibit error burst in the decrypted version of a composite speech and synchronization encrypted signal using a one-bit cipher feedback or similar encryption scheme is detected by monitoring the decrypted signal to detect synchronization errors. Upon detection of an error, the decrypted speech output is muted or disabled to avoid the annoying audible click otherwise produced.

11 Claims, 4 Drawing Figures

TRANSMITTER

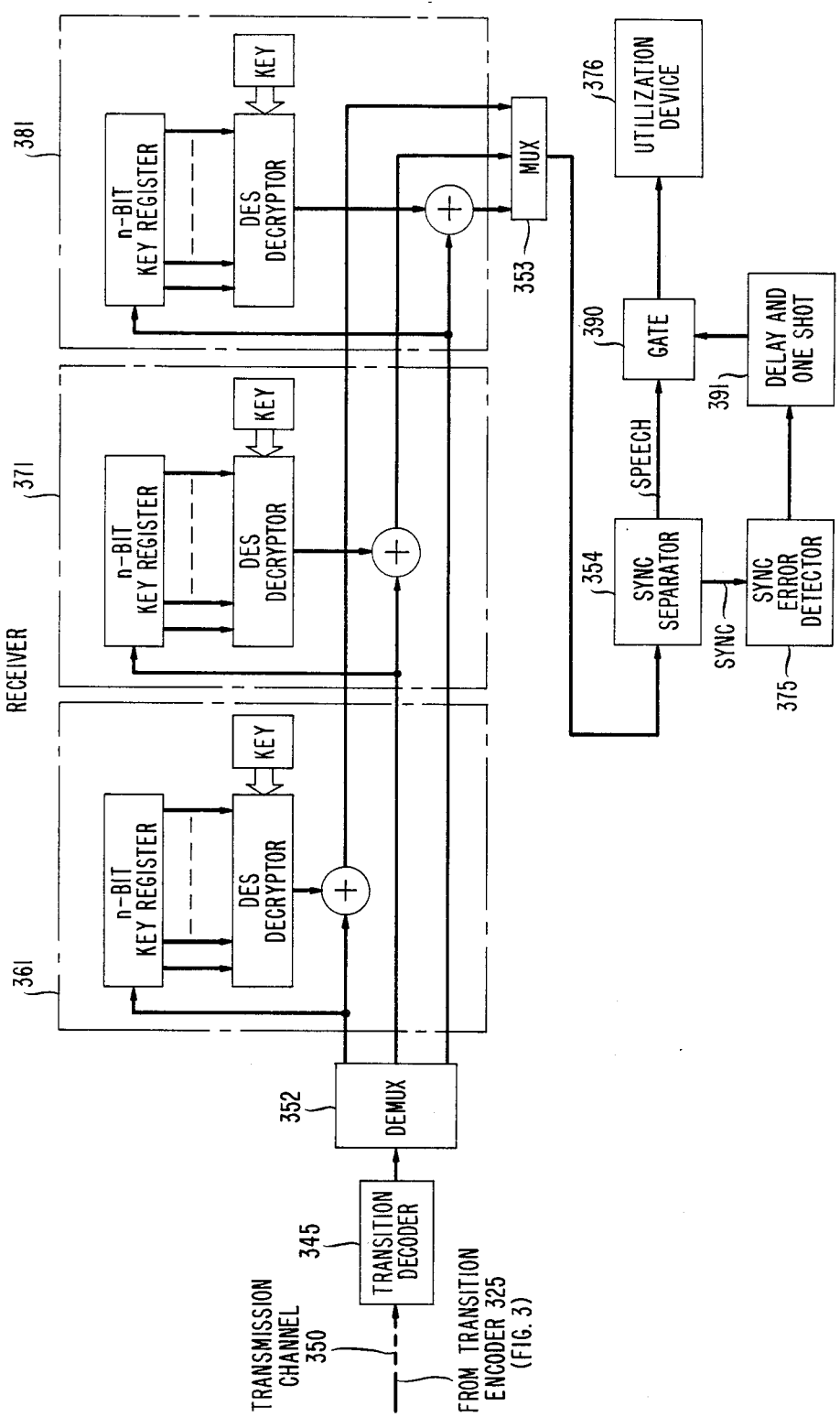

PROCESSING OF ENCRYPTED VOICE SIGNALS

BACKGROUND OF THE INVENTION

1. Field of the Invention

The present invention relates generally to processing of encrypted signals and, in particular, to processing of such signals which include speech information at a receiver after occurrence of a transmission error.

2. Description of the Prior Art

When a data stream which includes speech information is encrypted using a one-bit cipher feedback (also sometimes known as cipher text auto key or CTAK) technique, the occurrence of a single bit error in the transmission facility connecting the transmitter and receiver is expanded into an n+1 bit error burst after decryption, where n is the length of the encryption key register. This burst causes an undesirable audible "click" which can be quite annoying. To avoid the problem, an output feedback (key auto key) encryption scheme (for example, as described in *Federal Information Processing Standards*, Publication 81, "DES Modes of Operation") can instead be used in order to limit the burst length. However, this requires external cryptographic synchronization. Alternatively, retransmission of the original information can be attempted, but this increases processing delay. With yet another approach, redundant information can be encoded with the speech signal to enable easy detection and correction of the error. This, unfortunately, adds complexity and thus cost to the system and reduces the available data rate for nonredundant information.

SUMMARY OF THE INVENTION

In accordance with the present invention, the fact that a single bit transmission error produces an n+1 bit error burst in a one-bit cipher feedback (OBCFB) or cipher text auto key (CTAK) encryption system which includes an n-bit key register is turned to advantage in *detecting* the occurrence of such a transmission error. Specifically, the original speech signal is encoded in an m bit frame format, where each frame is separated by one or more synchronization pulses having a predefined value pattern. The encryption key register length and the frame length are advantageously selected such that the ratio r of n:m is, for example, between 5:1 and 10:1. This insures that when an error burst does occur, r sync bits will be affected, so that the statistical likelihood that all r sync bits will correctly survive in spite of the error is small. In accordance with a second aspect of the invention, the audible distortion normally associated with the error burst is eliminated by blanking the speech output for a suitable period. Blanking advantageously begins when the distorted signal would ordinarily reach an audio output device in the receiver, and lasts for an interval calculable from the bit rate and the value of n.

BRIEF DESCRIPTION OF THE DRAWING

The present invention will be more readily appreciated by consideration of the following detailed description when read in light of the accompanying drawing in which:

FIGS. 3 and 4 illustrate a transmitter and receiver respectively arranged for encrypted transmission of high rate signals using the principles of the present invention.

DETAILED DESCRIPTION

Figure 1:
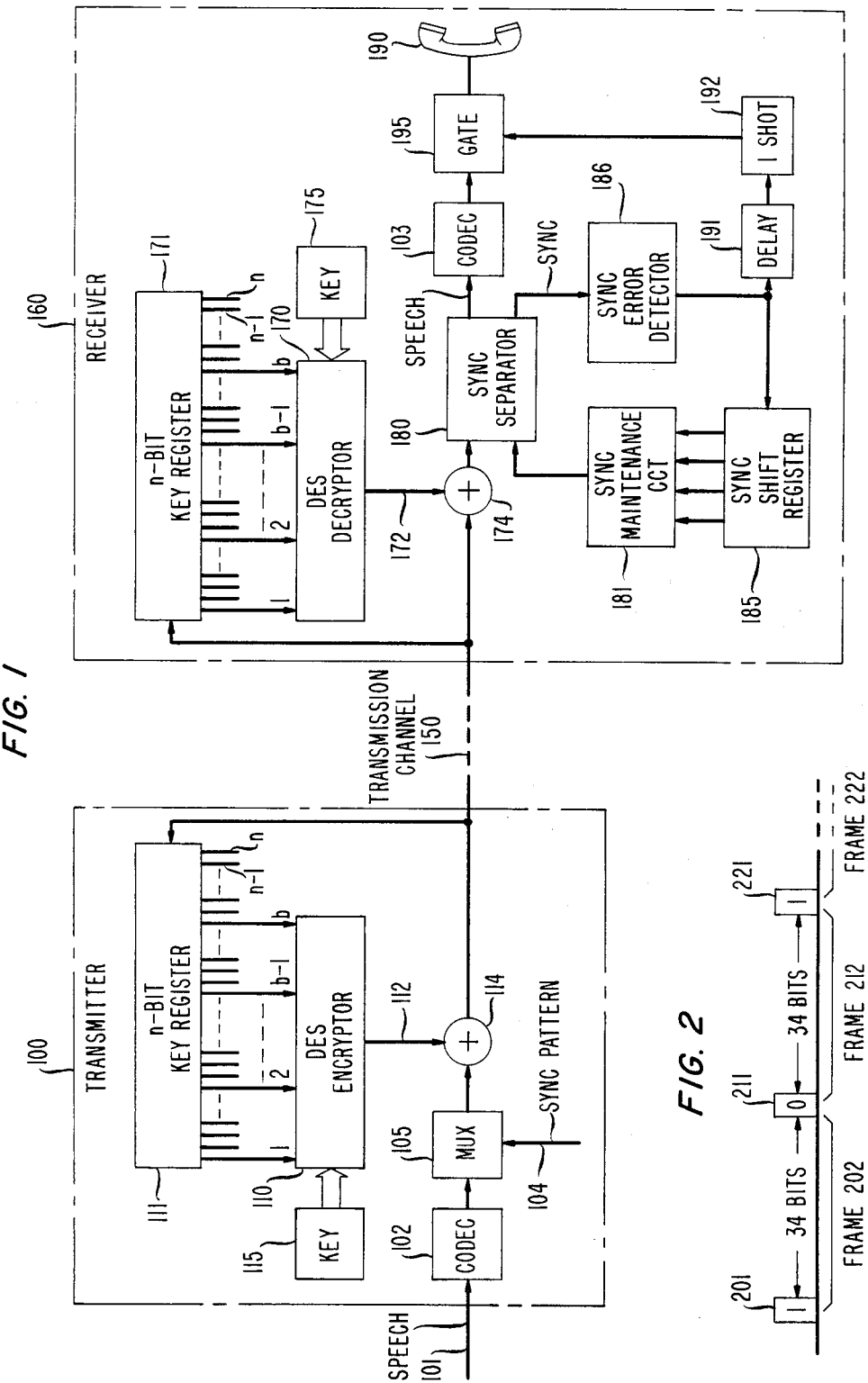
FIG. 1 is a block diagram of a transmitter arranged for one-bit cipher output feedback encryption of the speech signal and a corresponding receiver arranged to detect error bursts in the decrypted signal in accordance with the present invention.

Referring to FIG. 1, a digital transmission medium 150 is shown connecting a transmitter 100 with a receiver 160. Generally speaking, transmitter 100 is arranged to digitize an input signal applied on line 101, which includes speech information, using a codec 102, to add a preselected synchronization pattern to the digital signal and to encrypt the resulting composite signal using a one-bit cipher feedback or cipher text auto key encryption technique. More specifically, codec 102 may include a conventional A/D converter arranged to generate a 56 Kb/s digital output in a 35-bit frame format. The codec output is applied to multiplexer 105, which inserts a preselected sync pattern applied on line 104 at the beginning of each frame. At the heart of the encryption apparatus is a Data Encryption Standard (DES) encryptor 110 (typically configured as described in FIPS Pub. 81) which receives a plurality of inputs from an n-bit key register 111 and a preselected multibit key variable from a key store 115 and which produces a single bit output on line 112 in accordance with a predetermined transformation function prescribed for the DES. One bit of the output of encryptor 110, which is called the key stream, is combined on a bit by bit basis in adder 114 with the so-called "plain text" output from multiplexer 105, and applied both to transmission medium 150 and to the serial input of key register 111. As shown in FIG. 1, key register 111 is arranged to store the most recently encrypted n bits and to provide a b-bit parallel output to encryptor 110 derived from a predetermined subset of the n bits. In accordance with the present invention, n can have a value larger than b. By increasing the effective size of register 111, the likelihood of transmission error detection is increased, as explained below.

Receiver 160 includes a DES decryptor 170, an n-bit key register 171, and a key store 175 for a multibit key variable, each of which corresponds to a similar portion of transmitter 100. The encrypted signal received via medium 150 is applied, bit by bit, to key register 171 and to one input of an adder 174. Decryptor 170 receives a b-bit parallel input from register 171 corresponding to the inputs that the transmitter encryptor 110 receives from transmitter key register 111 and produces a key stream output on line 172 which forms the second input to adder 174. When the key variable in store 175 matches the key variable in store 115, decryptor 170 produces the same transformation as that performed in encryptor 110, so that the output of adder 174 is identical to the input of adder 114, as long as transmission errors have not occurred. To recover the original speech input, sync is stripped from the output of adder 174 using sync separator 180, and the resulting digital signal is applied to codec 103 which complements codec 102 in the transmitter and includes a conventional D/A converter to restore the signal to analog form.

With the foregoing arrangement, a transmission error of a single bit in medium 150 produces an error burst of n+1 bits in the decrypted signal recovered at the rceiver. Error expansion occurs because the erroneous bit first applied to adder 174 is concurrently entered in key register 171 and remains there for an additional n-bit interval, and all transformations performed in decryptor 170 during this interval are potentially affected by the error. For a transmission rate on medium 150 of 56 Kb/s and with the length n of key registers 111 and 171 set at 192, the resulting 193-bit error burst produces distortion of approximately 3 ms duration, which is perceived as an audible click.

Figure 2:
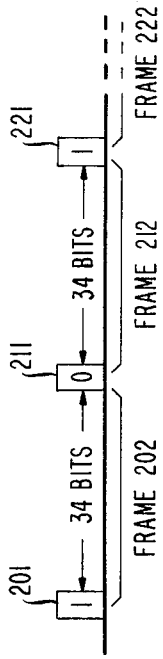
FIG. 2 is a diagram showing the timing relationships of the signals in the apparatus of FIG. 1.

In accordance with the present invention, the occurrence of a transmission error is detected in receiver 160 by a sync error detector 186, which monitors sync bits output from sync separator 180 to detect a deviation from the predetermined sync pattern applied on line 104. For example, as shown in FIG. 2, single sync bits 201, 211, 221 with alternate "1" and "0" values may be used to define the beginning of frames 202, 212 and 222, respectively. An invalid condition is thus detected when, after initial synchronization, the pattern of sync bit values derived from every 35$^{th}$ received bit deviates from the expected alternate 1's and 0's. The relationship between the length n of key register 171 and the length m of the frames established by multiplexer 105 determines the probability that an error burst will be detected by an erroneous sync pulse. Specifically, since the distortion caused by the transmission error is random in nature, the likelihood of an individual sync bit being in error is, on average, $\frac{1}{2}$. Because a burst of length n+1 potentially affects about n/m sync bits, the probability that *all* n/m sync bits will be correctly processed in spite of an error is thus $1-(\frac{1}{2})^{n/m}$. Selection of n/m>5 thus insures a relatively high probability of detecting a transmission error. An implementation of the present invention using a frame length of 35 bits and an effective key register of length 192 provided satisfactory results.

In order to avoid the annoying audible click normally associated with an error burst, the analog speech signal output from codec 103 is applied to a utilization device such as handset 190, via a gating switch 195 which is normally closed in the absence of synchronization errors. When a sync error does occur, indicating the presence of an error burst, the output from error detector 186 is used to trigger a one-shot circuit 192 via a delay element 191. Circuit 192, in turn, produces a control signal used to open gate 195 and thereby disable handset 190 from receiving the speech signal output from codec 103. The duration of the delay provided by element 191 and the active interval of circuit 192 are arranged so that gate 195 is opened when the error burst occurs, and closed after the error burst has passed. Experiments have shown that at nearly all error rates the elimination of 3 ms segments from a speech signal using this approach is considerably less annoying than the audible clicks otherwise produced by the error bursts. At reasonable error rates (less than 1 in 10000, for example) listeners usually do not even perceive the muted segment.

Receiver 160 of FIG. 1 may also be arranged to detect a loss of synchronization which occurs due to slippage or other errors not involving a transmission fault. For this purpose, a sync shift register 185 is arranged to accumulate error signals generated by detector 186; when a sufficient number of errors has occurred in close proximity, a sync maintenance circuit 181 is arranged to signal sync separator 180 to initiate a retiming operation. Various configurations for sync separator 180 are possible, and different retiming mechanisms are available. During the interval that synchronization is lost, many of the received sync bits will be in error. Fortuitously, the present invention causes the output speech signal to be muted while the receiver 160 is out of synchronization. Audio output is restored automatically upon reacquisition of correct synchronization.

As explained previously, the length of key registers 111 and 171, and the frame size and sync pattern used in multiplexer 105 determine the probability that an error burst will be detected. In some instances, the frame size may be decreased or the sync pattern on line 104 changed so that more than one sync bit is inserted in each frame. However, this reduces the system efficiency at a given transmission rate. Alternatively, the effective size of the key register can be varied. In this regard, it is noted that the number of bits b applied to encryptor 110 and decryptor 170 must normally equal to exceed 64; this number is dictated by the DES encryptor specification, and directly affecting the security of the system. Thus, while the minimum length of key registers 111 and 171 is fixed, their length n may be increased, adding only to the cost of the register itself. In general, for a register length n which is p times greater than that needed by the DES standard, the required connections between register 111 and encryptor 110 (and between register 171 and decryptor 170) may be advantageously fanned out, so that every p$^{th}$ bit is used.

Figure 3:
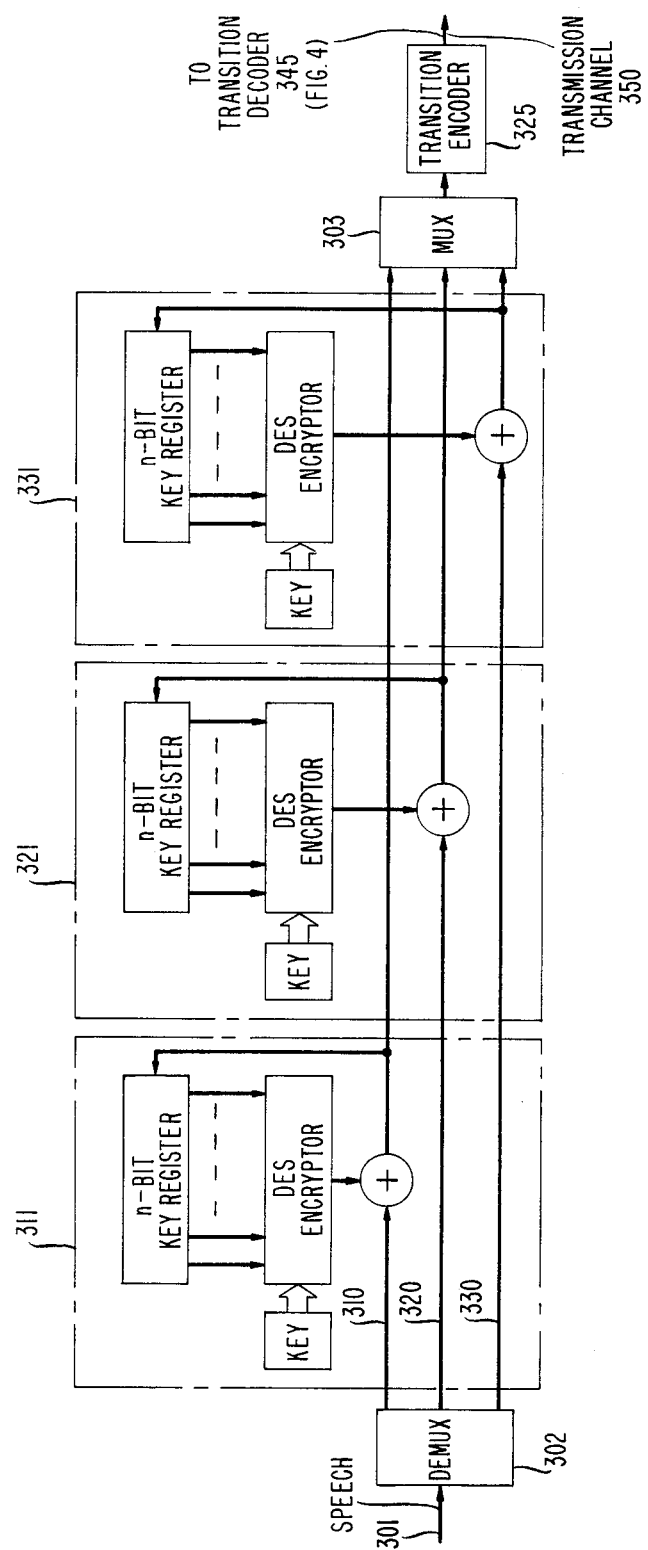

The present invention may also be used in instances in which the signal to be encrypted occurs at a rate K times faster than that which may be processed in a single encryption circuit. In such cases, the original signal of rate f bits/sec may be subsampled at rate f/K bits/sec, and the encryption performed in K separate encryptor circuits. For example, as shown in FIG. 3, a digital input signal at 3K bits/sec which includes synchronization information is applied on line 301 to a demultiplexer 302 such that every third sample (e.g., samples 1, 4, 7...) at rate K bits/sec appears on line 310, a different set of every third sample e.g., samples 2, 5, 8...) at rate K appear on line 320 and, the final set of every third sample (e.g., samples 3, 6, 9...) also at rate K appear on line 330. Each of the subsampled signals are processed individually in encryptor circuits 311, 321 and 331, each of which is arranged in a manner similar to that shown in FIG. 1. The resulting encrypted outputs are then combined in multiplexer 303 and may be applied to a transition encoder 325 before application to the transmission channel 350. Encoder 325, if present, responds to transitions in its input and is used to avoid polarity reversal problems which could affect medium 350. It is important to note that the multiplexing arrangement illustrated in FIG. 3 retains the self-synchronization characteristic of cipher text auto key systems, and no external synchronization is required. At the receiver, a complementary arrangement is used. The received signal may be applied to a transition decoder 345, which replicates the signal applied to encoder 325. However, if an i-bit transmission error has occurred in channel 350, an i+1 bit error is produced at the output of decoder 345, due to the feedback inherent in such circuits. The output of transition decoder 345 is demultiplexed in a demultiplexer 352, and the individual components, which occur at rate K bits/sec, are decrypted in separate decryptor circuits 361, 371 and 381 which are arranged identically to encryptors 311, 321 and 331. The components are then recombined in multiplexer 353. A sync separator 354 receives the output of multiplexer 353, in order to extract the original synchronization and speech information, and the former is applied to a sync error detector 375 while the latter is applied to a utilization device 376 via gate 390. As in the arrangement of FIG. 1, the output of error detector 375 triggers a one shot circuit 391, which produces an appropriately timed output pulse which opens gate 390.

If a one-bit transmission error occurs on transmission channel 350, then a two-bit error is produced at the output of decoder 345. This error is, in turn, expanded during decryption, so that an n+1 bit error is produced in two of the three outputs of the individual decryption circuits 361, 371 and 381. When the individual outputs are recombined in multiplexer 353, the effect of the error is thus distributed in time, potentially distorting two out of each group of three bits in the recombined signal for an n-bit interval. While this distortion might ordinarily be considered detrimental, it facilitates detection of the error by sync error detector 375, which monitors the sync bit pattern. Upon detection of an error, gate 390 is opened, blanking the speech output for the time interval corresponding to the error burst and rendering the distortion imperceptible.

Various modifications and adaptations of the present invention will be apparent to those skilled in the art. For that reason, it is intented that the scope of the invention be limited only by the appended claims. For example, in some instances it may be desirable that the muting function provided by gate 195 be initiated only at the next zero crossing of the speech signal, to minimize the production of a discontinuity in the output. This is accomplished by installation of a zero crossing detector and appropriate logic. It is also to be noted that while the encrypted signal described above contains speech and synchronization information, it may also include other information, such as data. Finally, while the invention has been described in connection with cipher text auto key encryption, it will be useful with other encoding techniques such as block encryption which have the property of causing error bursts in the decoded signal as a result of one or more bit transmission errors.

What is claimed is:

1. A receiver for processing an encrypted composite signal including speech and synchronization information which is subject to an error burst in the decrypted version of said encrypted signal as a result of one or more bit transmission errors in said encrypted signal, including:
    (a) means for separating synchronization and speech information from said decrypted version,
    (b) means for detecting said error burst by monitoring said separated synchronization information for a deviation from a predetermined pattern, and
    (c) means for disabling application of said speech information to an output utilization device in response to detection of an error by said detecting means.

2. Apparatus for processing an encrypted composite signal including speech and synchronization information including:
    (a) means for separating synchronization and speech information from a decrypted version of said composite signal,
    (b) means for detecting an error in said synchronization information, and
    (c) means for disabling application of said speech information to a utilization device in response to an output from said detecting means.

3. The invention defined in claim 2 wherein said composite signal is encrypted using an encryption technique in which one or more bit transmission errors in the encrypted version of said composite signal produce a multibit error in the decrypted version of said composite signal and said apparatus further includes means for decrypting said encrypted signal comprising:
    (d) means for storing n bits of said encrypted signal,
    (e) means for generating a key stream as a joint function of a plurality of said stored bits and a preselected multibit key variable, and
    (f) means for combining said key stream output, bit by bit, with said encrypted signal.

4. Apparatus for processing a composite signal including speech and synchronization information, said signal being encrypted using an encryption technique in which one or more errors in the encrypted version of said composite signal produce a multibit error in the decrypted version of said composite signal including:
    (a) means for decrypting said encrypted composite signal to recover said speech and synchronization information,
    (b) means for monitoring said recovered synchronization signal to detect errors in said encrypted composite signal, and
    (c) means responsive to said monitoring means for muting said recovered speech information for the duration of a detected error.

5. Apparatus for processing an encrypted version of a composite signal which includes speech and synchronization information, each bit of said encrypted version formed by combining a bit of said composite signal with a bit output from an encryption circuit, each of said encryption circuit output bits being a function of a plurality b of previously encrypted bits stored in a key register and an encryption key variable, said apparatus including:
    (a) means for generating a decrypted version of said encrypted signal,
    (b) means for detecting errors in said decrypted version by monitoring synchronization information contained therein, and
    (c) means for muting speech information contained in said decrypted version in response to the output of said detecting means.

6. The invention defined in claim 5 wherein said decrypted version generating means includes:
    (1) means for storing n most recently generated bits of said encrypted version,
    (2) decryption means for generating a series of bits as a function of a plurality b of said stored bits and said encryption key variable, and
    (3) means for combining each bit output from said decryption means with a bit of said encrypted version.

7. The invention defined in claim 6 wherein the number b of said stored bits applied to said decryption means is less than n.

8. The invention defined in claim 7 wherein said apparatus further includes:
    means for applying speech information separated from said decrypted version to a utilization device, and
    said muting means includes a gate for disabling said applying means.

9. In an encryption system arranged to provide an encrypted version of a composite signal including speech and synchronization information, said encrypted version being formed by combining said composite signal, bit by bit, with a key stream signal formed by transforming a plurality of already encrypted bits stored in a first n-bit key register in accordance with a preselected multibit encryption key, apparatus for reducing the effects of an error burst occurring in a decrypted version of said signal as a result of a transmission error of one or more bits, comprising:

(a) means for forming said decrypted version by combining said encrypted version, bit by bit, with a key stream formed by transforming a plurality of most recently encrypted bits stored in a second n-bit key register in accordance with said preselected multibit encryption key, (b) means responsive to said decrypted version forming means for separating said speech and synchronization information, (c) means for monitoring said synchronization information to detect an erroneous pattern indicative of the occurrence of said error burst, and (d) means for disabling application of said speech information to a utilization device for a period determined in response to said monitoring means.

10. Apparatus for processing a composite speech and synchronization signal after transmission over a transmission channel which subjects said signal to error bursts, including:

(a) means for separating speech and synchronization information from said composite signal, (b) means for monitoring said separated signal to detect the occurrence of transmission errors, and (c) means responsive to said monitoring means for disabling connecting of said separated speech signal to an output device upon detecting of an error.

11. Apparatus for detecting transmission errors in the output of an encrypted speech transmission system, said system arranged to encrypt an original signal including speech and synchronization information using an encryption technique wherein each bit of said composite signal is combined with a bit output from an encryption circuit prior to application to said transmission medium, said encryption circuit including a key register containing n previously processed output bits, an encryption key store, and means for combining b bits in said key register with said encryption key in accordance with a predetermined transformation function to yield each bit of said output signal, including:

(a) decrypting means for recovering said original signal by combining each bit of said output with a bit output from a decrypted circuit, said decrypted circuit including a key register containing n previously received output bits, an encrypted key store and means for combining b bits in said key register with said encrypted key in accordance with said predetermined transformation function, (b) means for separating the speech and synchronization information from said recovered original signal, and (c) means for muting said speech signal upon detection of an error in said synchronization signal.

* * * * *